Patented Jan. 23, 1945

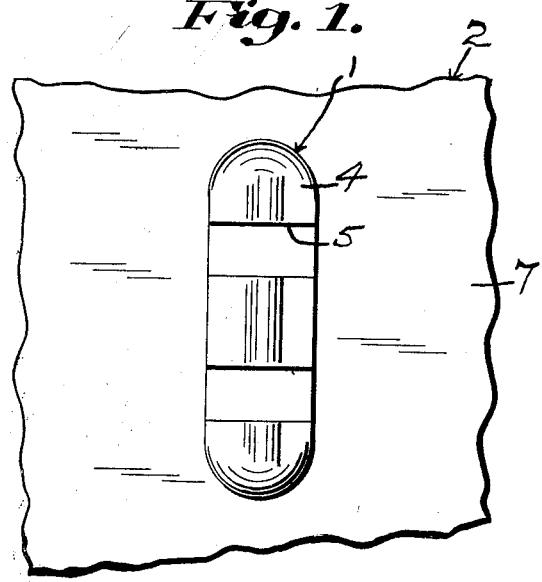
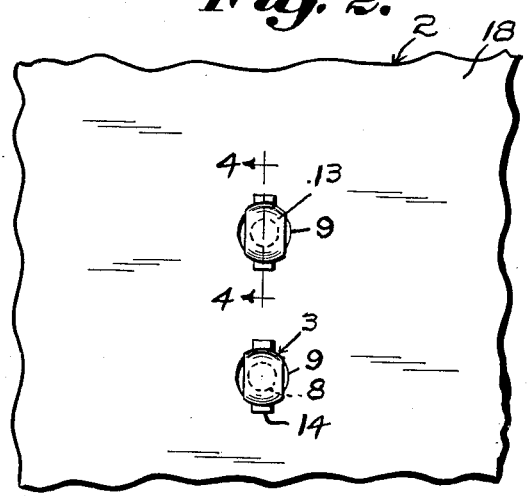
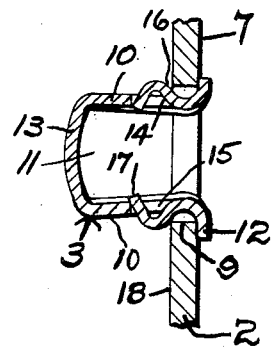
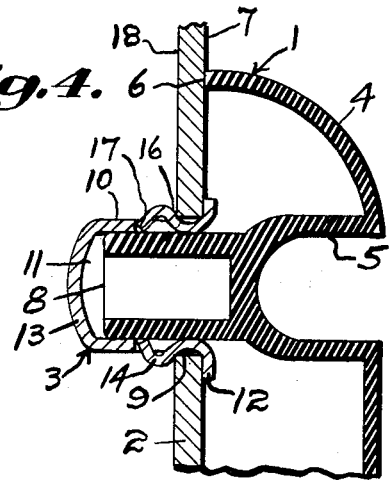
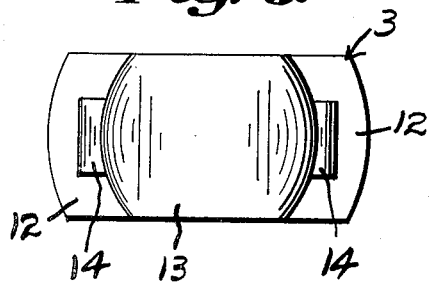
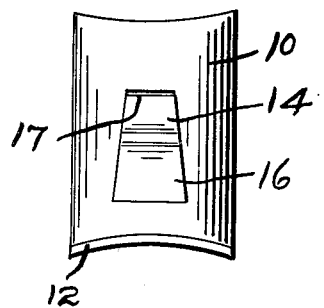

2,368,027

UNITED STATES PATENT OFFICE 2,368,027

FASTENER AND FASTENER INSTALLATION

Russell W. Johnson, Detroit, Mich., assignor to United-Carr Fastener Corporation, Cambridge, Mass., a corporation of Massachusetts Application March 26, 1940, Serial No. 326,027

8 Claims. (Cl. 24—73)

This invention relates to improvements in fastener members and fastener installations and is particularly, though not exclusively, directed to a fastener adapted for securing articles of manufacture such as shelf support brackets to a supporting panel where access is had to one side only of the panel.

My invention has for its chief object to provide a fastener member of simple and inexpensive construction adapted to be secured in locked engagement with a supporting panel when an article of manufacture is assembled with the panel and at the same time provide means gripping the article or a part projecting therefrom so as to maintain the article in proper fixed position relative to the installation.

Other objects and uses of my invention will be apparent from inspection of the drawing and specification hereinbelow set forth.

Referring to the drawing, in which I have illustrated a preferred embodiment of my invention:

Fig. 1 is a top plan view of an installation showing an article of manufacture such as a shelf-supporting bracket secured to a supporting panel by means of my improved fastener member;

Fig. 2 is a rear view of the installation shown in Fig. 1;

Fig. 3 is a sectional view through a panel before attachment of the supporting bracket thereto and showing the fastener member in initial assembly therewith;

Fig. 4 is an enlarged section taken along the line 4—4 of Fig. 2;

Fig. 5 is a bottom plan view of my improved fastener member per se; and

Fig. 6 is a side view of the fastener member shown in Fig. 5.

Referring to Figs. 1, 2 and 4, I have shown a preferred installation of my improved fastener member and I have illustrated the manner in which an article of manufacture such as a shelf-supporting bracket 1 is secured to a thin supporting panel 2 through means of my improved fastener members 3. It is understood that the fastener members to which my present application is directed are equally adaptable to securing various other forms of articles of manufacture to a supporting panel, as will be understood from consideration of the specification hereinbelow set forth.

The bracket 1 is of a type commonly used in refrigerator manufacture and is adapted to be secured to the inner liner, which, in the drawing, is represented by the panel 2. The bracket 1 is of hollow plastic construction providing a body 4 having a pair of depressions 5 for receiving shelves or the like to maintain them in proper position in the interior of the refrigerator. The body 4 has a marginal edge 6 adapted to abut a surface 7 of the panel 2 when the parts of the installation are in final assembly. Stud portions 8, which are preferably, but not exclusively, integral with the body 4, extend beyond one side of the body in spaced fixed relation one from another and are preferably of circular cross-sectional shape. The panel 2 has a pair of spaced apertures 9 (Fig. 2), each having a predetermined diameter relative to dimensions of the fastener member 3 so that the walls thereof cooperate with the fastener members to maintain the fasteners in temporary fixed position relative to the panel before application of the bracket 1 to the installation.

Referring in detail to my preferred fastener member, I have shown one formed from a single strip of sheet metal. The fastener member is relatively easy to make and may be formed by simple shearing and bending operations. The fastener member has a shank including a pair of wall portions 10—10 which are preferably curved slightly in cross-sectional shape so as to conform substantially to the circumferential curve of the stud portion 8. The walls 10—10 are spaced apart and define an axial passage 11 therebetween for receiving the stud portion 8. Support-engaging portions 12 extend laterally from the wall portions 10—10 at one end of the shank and engage the surface 7 of the panel 2 to limit axial movement of the fastener through the aperture 9 in the direction of its insertion. A connecting portion 13 connects the walls 10—10 at an opposite end of the shank. Yieldable finger portions 14 integrally joined to the walls 10—10 near the support-engaging portions 12 are formed from material entirely within the marginal edges of the walls 10—10 so as to leave openings 15 in their respective walls, as shown in Fig. 3. Each of the finger portions 14 extends outwardly from its respective wall 10 and downwardly and then inwardly forming tapering shoulder portions 16. The free ends of the fingers 14 project through the opening 15 into the axial passage 11 of the fastener so that the outermost free edges 17 of the fingers may enter biting engagement with the stud portion 8 when the stud portion is inserted into the axial passage 11.

Assembly of the parts of my installation is a relatively simple matter and may be carried out from a position entirely on the side 7 of the panel 2. In the first step, the fastener shank is inserted through the aperture 9 until the portions 12—12 abut the surface 7 of the panel. During this action the walls 10—10 are snapped through the aperture 9 to engage the shoulders 16 with the side 18 of the panel 2, which is opposite to the side 7, to hold the fastener members in temporary fixed assembly with the panel. Also, it will be noticed that when the fastener members are in the aforesaid temporary fixed assembly the outermost free edges 17 of the finger portions 14 are disclosed within the axial passage 11, as most clearly shown in Fig. 3. Next the stud portions 8 of the bracket 1 are moved through the openings 9 into the axial passage 11 of the respective fastener. During this action the stud portions engage the edges 17 of the fingers 14 causing the fingers to expand to lock the shoulders 16 behind the side 18 of the panel, as most clearly shown in Fig. 4. At the same time the edges 17 of the fingers engage firmly the stud portion 8 and may even bite into the same to make it difficult in ordinary use of the installation for the stud portions to withdraw from the axial passages 11 of the fasteners in a direction opposite to that of their insertion. It will be seen that the distance the stud portions 8 extend into the axial passages 11 of the fasteners is controlled by abutment of the edges 6 of the body 4 of the bracket with the side 7 of the panel.

Thus by my invention I have provided improved fastener members of very simple construction and capable of quick and easy assembly with a supporting panel to effect the desired purposes.

Although I have illustrated a preferred embodiment of my invention, I do not wish to be limited thereby because the scope of my invention is best defined by the following claims.

I claim:

1. A fastener member comprising a shank having spaced wall portions defining an axial opening for receiving a stud means, support-engaging means adjacent one end of the shank, and a yieldable finger portion integrally joined to a wall of said shank, said finger portion having a shoulder normally disposed laterally of said shank, and said finger portion having its free end extending into said stud-receving opening.

2. A fastener member comprising a shank having spaced wall portions defining an axial opening for receiving a stud means, support-engaging means adjacent one end of the shank, a portion connecting said wall portions at an opposite end of said shank from said support-engaging means, opposed yieldable finger portions integrally joined to said wall portions, each of said finger portions having a shoulder normally disposed laterally of said shank, and at least one of said finger portions having its free end extending into said stud-receiving opening.

3. A fastener member comprising a shank having spaced wall portions defining an axial opening for receiving a stud means, support-engaging means adjacent one end of the shank, and a yieldable finger portion integrally joined to a wall portion of said shank and formed from material of said wall to leave an opening therein, said finger portion extending outwardly from said wall portion and then inwardly toward said shank forming a shoulder, said shoulder facing said support-engaging means and spaced therefrom, and the free end of said finger extending through said opening of said wall and into said stud-receiving opening for the purpose described.

4. A fastener member comprising a shank having a pair of spaced wall portions defining an axial opening for receiving a stud means between them, a portion connecting said walls at one end of said shank, said walls being completely separated except where joined by said connecting portion, and support-engaging means extending laterally from said walls at an opposite end of said shank, a yieldable finger portion integrally joined to each of said wall portions, each of said fingers having a shoulder disposed laterally of said respective wall portion, and stud-engaging means extending into said opening between said walls.

5. A fastener member comprising a shank having a pair of spaced wall portions, said wall portions being of curved cross-sectional shape and defining an axial opening for receiving a stud means between them, a portion connecting said walls at one end of said shank, said walls being completely separated except where joined by said connecting portion, and support-engaging means extending laterally from said walls at an opposite end of said shank, a yieldable finger portion integrally joined to each of said wall portions, each of said fingers having a shoulder disposed laterally of said respective wall portion, and stud-engaging means extending into said opening between said walls.

6. A fastener installation comprising a supporting panel having an aperture, a fastener member assembled with said panel through said aperture, and a part to be secured to said panel having a stud portion engageable with said fastener member through said aperture, said fastener member comprising a shank having spaced wall portions defining an axial passage receiving said stud portion, means at one end of said shank engaging said panel to limit axial movement of said fastener through said aperture in one direction, yieldable finger portions integrally joined to said wall portions and formed from material within marginal edges thereof, each of said fingers having a shoulder engaging said support and the free ends of said fingers being disposed within said axial passage and engaging said stud portion whereby said fingers are locked in engagement with said panel and said stud portion is securely gripped by said free end portions.

7. A fastener installation comprising a supportiong panel having an aperture, a fastener member assembled with said panel through said aperture, and a part to be secured to said panel having a stud portion engageable with said fastener member through said aperture, said fastener member comprising a shank having spaced wall portions defining an axial passage receiving said stud portion, means at one end of said shank engaging said panel to limit axial movement of said fastener through said aperture in one direction, yieldable finger portions integrally joined to said wall portions and formed from material within marginal edges thereof, each of said fingers having a portion thereof forming a shoulder engaging said support and having another portion thereof disposed within said axial passage and adapted to engage said stud portion.

8. A fastener installation comprising a supporting panel having an aperture, a fastener member assembled with said panel through said aperture, and a part to be secured to said panel by means of a stud portion engageable with said fastener member through said aperture, said fastener member comprising a shank having a pair of spaced wall portions defining an axial passage for receiving said stud portion, portions extending laterally from said wall portions at one end of said shank engaging said panel, and a portion connecting said wall portions at an opposite end of said shank, yieldable finger portions integrally joined to said wall portions and formed from material within the marginal edges thereof, each of said fingers having a shoulder engaging said support, and having a portion thereof disposed within said axial passage and adapted to engage said stud portion.

RUSSELL W. JOHNSON.